Aug. 8, 1967 W. S. HENDERSON 3,334,801

MULTI-CELL CARTONS

Filed Sept. 29, 1965

8 Sheets-Sheet 1

INVENTOR.
WILLIAM S. HENDERSON

BY Hugh A. Kirk

ATTORNEY

Aug. 8, 1967 W. S. HENDERSON 3,334,801

MULTI-CELL CARTONS

Filed Sept. 29, 1965

8 Sheets-Sheet 2

INVENTOR.
WILLIAM S. HENDERSON

BY

Hugh A. Kirk

ATTORNEY

INVENTOR.
WILLIAM S. HENDERSON
BY
Hugh A. Kirk
ATTORNEY

Aug. 8, 1967 W. S. HENDERSON 3,334,801

MULTI-CELL CARTONS

Filed Sept. 29, 1965 8 Sheets-Sheet 4

INVENTOR.
WILLIAM S. HENDERSON

BY Hugh A Kirk

ATTORNEY

INVENTOR.
WILLIAM S. HENDERSON
BY
Hugh A Kirk
ATTORNEY

INVENTOR.
WILLIAM S. HENDERSON
BY
Hugh A. Kirk
ATTORNEY

Aug. 8, 1967 W. S. HENDERSON 3,334,801

MULTI-CELL CARTONS

Filed Sept. 29, 1965

8 Sheets-Sheet 7

INVENTOR.
WILLIAM S. HENDERSON

BY

ATTORNEY

Aug. 8, 1967 W. S. HENDERSON 3,334,801

MULTI-CELL CARTONS

Filed Sept. 29, 1965 8 Sheets-Sheet 8

INVENTOR.
WILLIAM S. HENDERSON

BY Hugh A. Kirk

ATTORNEY

United States Patent Office 3,334,801
Patented Aug. 8, 1967

3,334,801
MULTI-CELL CARTONS
William S. Henderson, Monroe, Mich., assignor to Consolidated Packaging Corporation, Monroe, Mich., a corporation of Michigan
Filed Sept. 29, 1965, Ser. No. 491,323
25 Claims. (Cl. 229—28)

This invention relates to a new and improved multi-cell carton. More particularly it deals with an egg carton which may be formed of a single blank of paperboard which may be cut and scored so that when it is in a collapsed condition it may be easily set up by a set-up machine.

It is an object of this invention to produce a simple, efficient, effective, economic, and strong multi-cell or partitioned carton, such as an egg carton, which is easy to set up, easy to fill, and easy to close by machines.

Another object is to provide such a multi-cell carton in which the partitions forming the cells are folded into position by a set-up machine, which carton has features to maintain said partitions in erect position thereafter against any inherent action toward collapse of the partitions by stress at their folds.

Another object is to produce such a multi-cell carton which has a cover that is supported by special means provided on one of the partitions forming the cells therein.

Another object is to produce such a multi-cell carton in which the transverse partitions are easy to set up with a minimum of jamming in a set-up machine.

Another object is to produce such a multi-cell carton which contains special structural features, such as notches and apertures, for alignment with fingers and abutting means in a set-up machine to reduce the number of cartons which might become jammed in the machine.

Another object is to produce such a multi-cell carton having structural features permitting easier viewing of and access to the articles, at least in the front row of cells of the carton.

Another object is to produce such a multi-cell carton in which the cover or lid therefor is easy to lock closed and to unlock for opening, but remains locked in its closed position if not specifically unlocked.

Generally speaking, the multi-cell or partitioned carton of this invention comprises two rows of cells, and is folded from a single cut and scored blank which may be folded once and glued to form a collapsed carton for easy shipment and set up in a set-up machine at the place where it is used. This carton primarily comprises relatively plain front and back walls, a top from which transverse partitions are folded, and a bottom wall, from the longitudinal center of which extends upwardly a longitudinal partition dividing the transverse or cross partitions into two rows. The back edge of the top is provided with a flange strip for fastening to the inside of the back wall, such as by an adhesive. The carton also may have hingedly joined to the upper edge of the back wall, a relatively plain cover or lid which cover or lid also may be provided with a front flap which may have tongues and/or hooks for engagement between the cross-partitions adjacent the front wall.

The top from which the transverse or cross-partitions are folded includes substantially right triangular webs at the upper ends of the majority of said cross-partitions, which webs are in a substantially horizontal plane and may have hypotenuses which are convex for small and medium size articles or eggs to be placed in the cells, straight hypotenuses for large articles or eggs, and concave hypotenuses for extra large sized articles or eggs. Some of the cross-partitions also may be provided with upwardly projecting members for supporting the lid which may have notches for alignment with means in a set-up machine for the carton, as well as having apertures and/or hooks in their lower sides for engagement with the longitudinal center partition which has notches therein to cooperate with said apertures and/or hooks. The end and center cross-partitions may be of full length while those intermediate thereof may be of partial length.

The front wall or panel may be provided with wide V-notches in between the transverse partitions to provide easy viewing of and access to the articles in the front row of cells when the cover is lifted, to facilitate the set up of the cartons by machine, and to facilitate engagement of the hooks on the flap of the lid or cover under said webs.

The bottom panel section may be provided with slots and/or hook-slits for engagement of at least the end and one central cross-partition, and also may be provided with cushioning slits at the bottom of each cell and machine engaging apertures.

The longitudinal central partition, folded like an inverted V upwardly from the central portion of the bottom panel section, is provided with a plurality of notches for engagement with all of the transverse or cross-partitions. These notches for at least some of these cross-partitions may have one abutting edge thereof located beyond the center line of the fold line at the end webs of that cross-partition to more than compensate for any inherent action in the fold to re-collapse said partition. Along the other or opposite edge of each said notch may be a projecting tongue for hooking or locking into an aperture in the cooperating cross-partition.

The longitudinal center partition, particularly in the carton for extra large articles or eggs in which the center partition is extra long, may be provided with upwardly extending lid or cover engaging or supporting tabs cut from in between the cross-partition notches on alternate sides of the central longitudinal partition. For release of these tabs the cut-outs therefor on the opposite wall of the longitudinal partition may be provided with oppositely complementary hooked slits at their lower corners for easy release of these tabs in the set-up machine.

The above mentioned and other features and objects of this invention and the manner of attaining them will become more apparent and the invention itself will be understood best by reference to the following description of embodiments of the invention taken in conjunction with the accompanying drawings, wherein.

I. SMALL AND MEDIUM SIZE EGG CARTON

Figure 1:
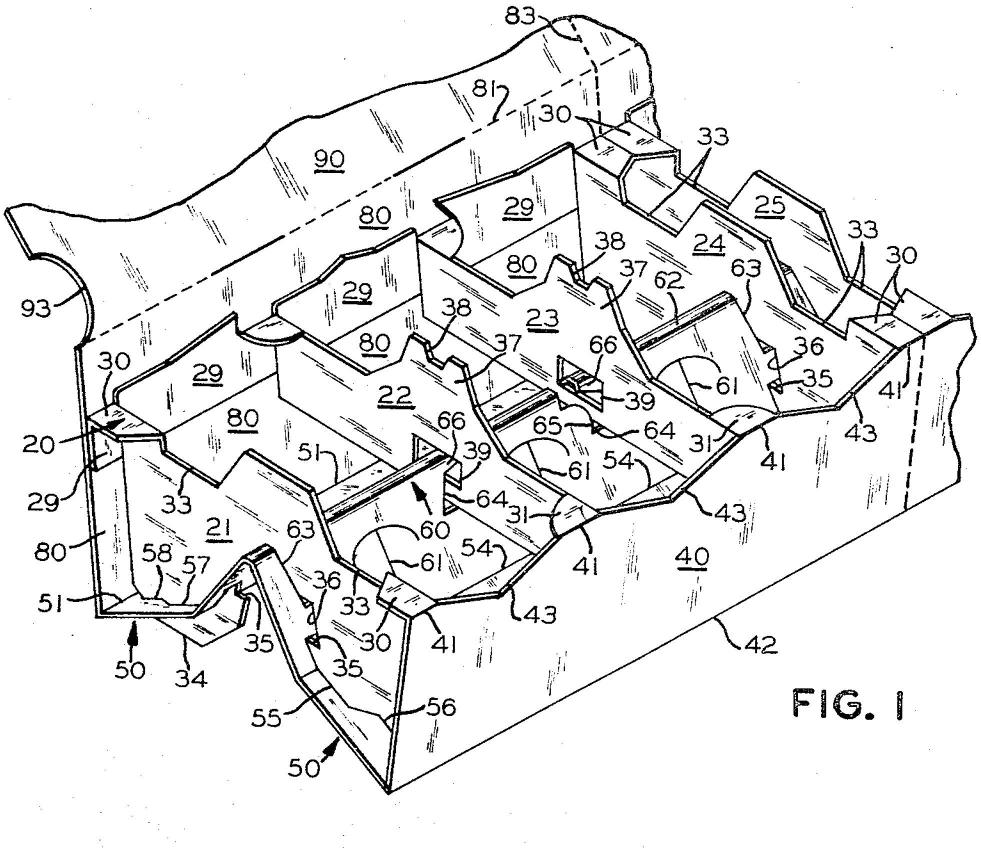
FIG. 1 is a perspective view with parts broken away of an egg carton for medium and small size eggs according to one embodiment of this invention.

Referring first to the embodiment shown in FIGS. 1 through 6, which are directed to the multi-cell egg carton for medium and small size eggs, the major parts of the carton, as in all the figures, comprise a top panel 20, downwardly from which the transverse or cross-partitions 21 through 28 are folded and which has a back downwardly extending flange 29 for attachment to the back wall panel 80, such as by an adhesive. Hingedly attached to the top panel 20 is the front wall or panel 40 hingedly attached along score line 41 to the top panel 20 and hingedly attached to bottom panel section 50 along score line 42. The bottom panel section 50 is provided with a central upwardly extending longitudinal rib section 60. This bottom panel 50 is hingedly attached along score line 51 to the back panel 80 which back panel may have hingedly attached along its top score line 81, a cover or lid portion 90 which may have hingedly attached along its front score line 91 a tuck-in flap portion 92.

I–1. *Top panel and cross-partitions*

Figure 5:
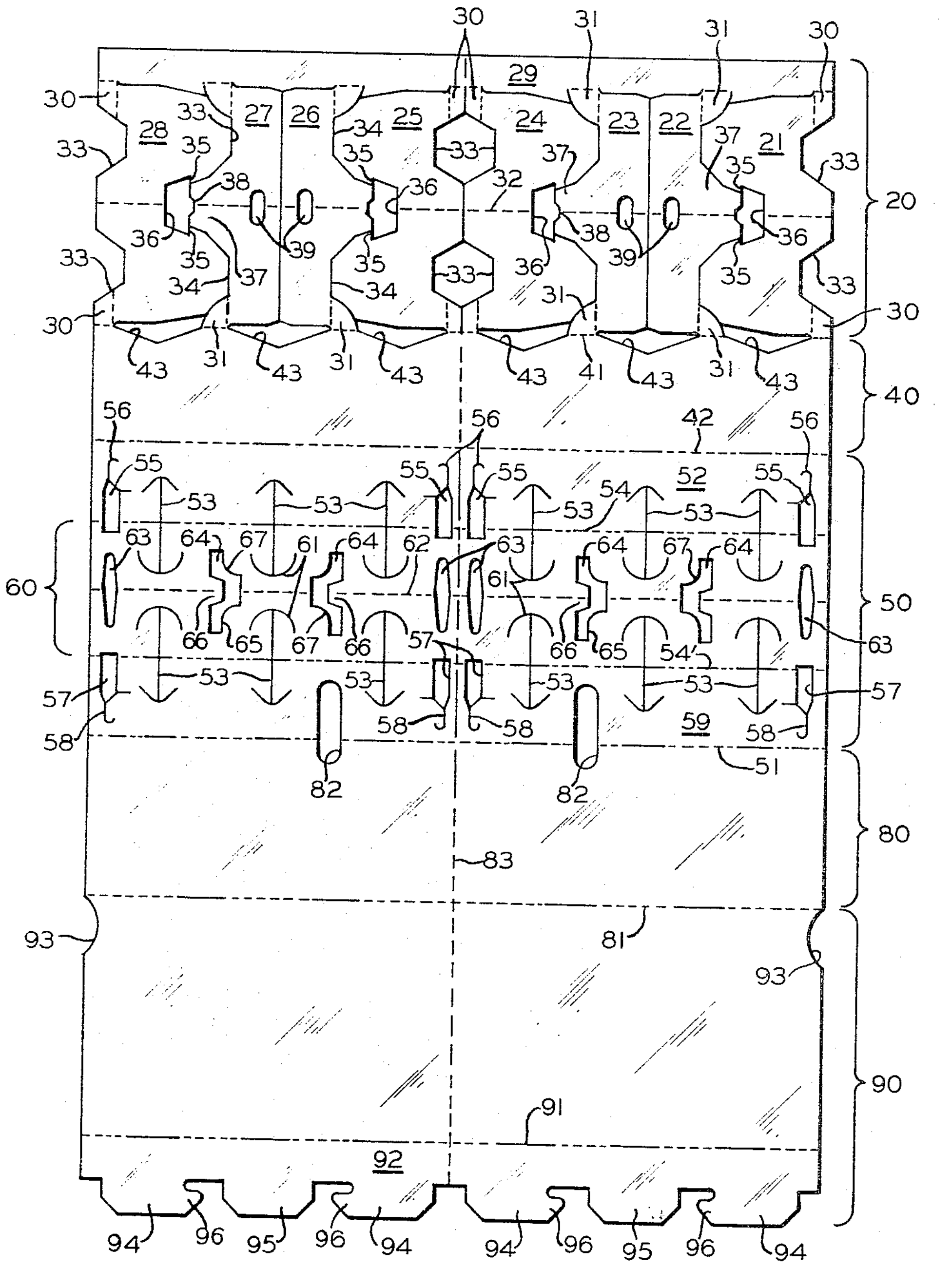
FIG. 5 is a plan view of the single paperboard blank from which the carton of FIGS. 1 through 4 is produced.

Referring back now more specifically to the top panel 20, there are shown two types of partitions, namely full-depth partitions 21, 24, 25 and 28 at the end and a pair in the center of the carton, and intermediate partial or half-depth partitions 22, 23, 26 and 27 (see specifically the blank shown in FIG. 5).

At the upper ends of the full depth cross-partitions 21, 24, 25 and 28 there are provided trapezoidal shaped portions 30 which remain in the horizontal plane of the top panel 20, and from a scored edge of each of which trapezoidal portions, the depending full depth end and center cross-partitions are folded downwardly in the set-up machine.

Similarly, the ends of the partial depth cross-partitions 22, 23, 26 and 27 are provided with substantially right triangularly shaped sections 31 which remain horizontal in the plane of the top panel 20 and from one side of each of which these cross-partitions are downwardly folded. The small and medium size egg cartons have hypotenuses of these triangular sections 31 convex so as to project outwardly at the corners of the cells, as shown specifically in FIGS. 1, 3, 5 and 6, to more closely engage the smaller size articles or eggs placed in the cells of the carton, thereby preventing them from rattling or moving in their cells in the carton.

Figure 6:
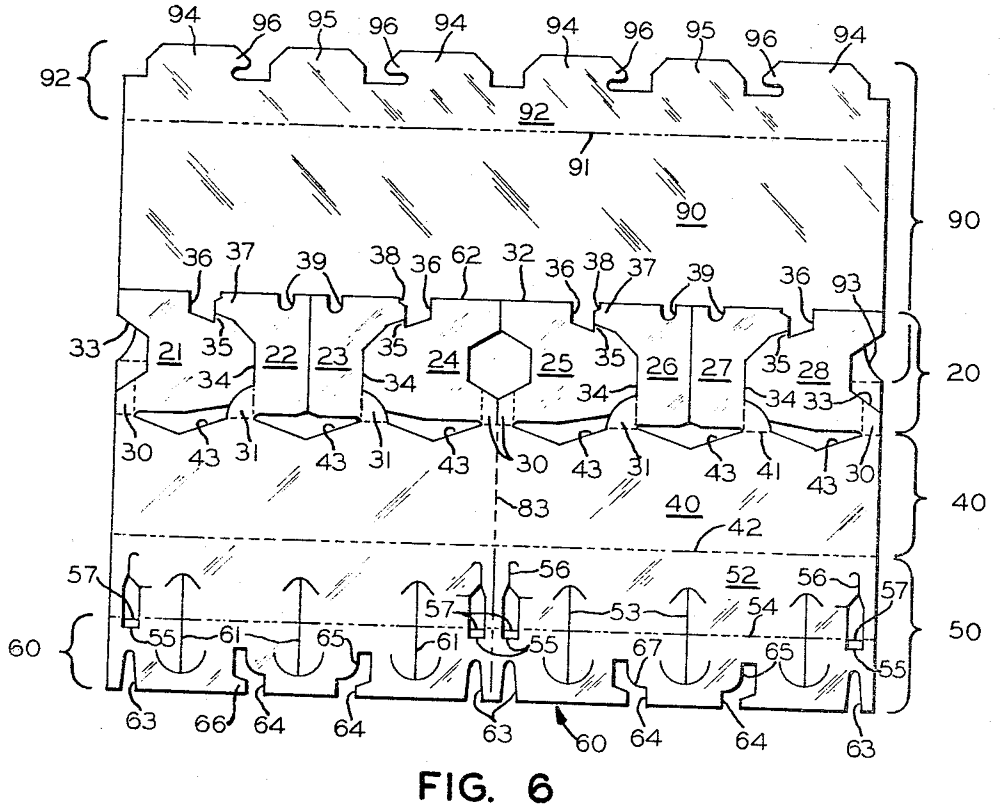
FIG. 6 is a plan view of the blank shown in FIG. 5 folded and glued together in the form of a collapsed egg carton, ready for set up in a set-up machine to form the carton shown in FIGS. 1 through 4.

Longitudinally of the carton blank shown in FIGS. 5 and 6, and centrally across all the cross-partitions is provided a score line 32, along which these cross-partitions are folded into two portions, when the carton is in its collapsed position (see FIG. 6) ready for the set-up machine.

The full depth cross-partitions are each provided with a pair of top edge notches 33 which form hexagon knockout openings in the center of the blank as shown in FIG. 5. The lower edge of each of the full depth cross-partitions 21, 24, 25 and 28 form a pair of polygonally shaped supporting legs with a pair of aligned horizontal central straight supporting edges 34 for the carton when in set-up position (see FIGS. 1, 2 and 4). Between these legs on each partition 21, 24, 25 and 28 are provided hooks 35 for locking engagement into apertures 63 described later in the central longitudinal inverted V partition 60 to hold said longitudinal partition in place. These hook portions 35 are at the edges of trapezoidal shaped notches 36, which form similar shaped apertures in the blank shown in FIG. 5. The converging trapezoidal edges of these notches engage the opposite outsides of the central inverted V-shaped longitudinal center partition 60.

Figure 2:
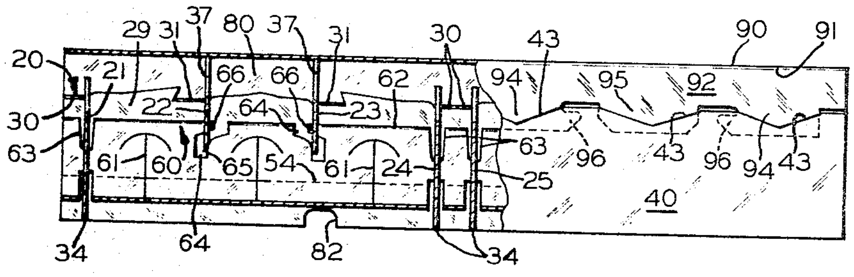
FIG. 2 is a partially sectioned side elevation on a reduced scale of an egg carton according to FIG. 1, being sectioned along line II—II of FIG. 3.
Figure 4:
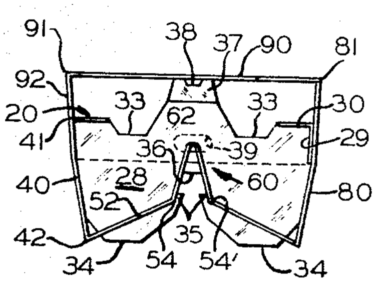
FIG. 4 is an end view of the carton shown in FIGS. 2 and 3.
Figure 3:
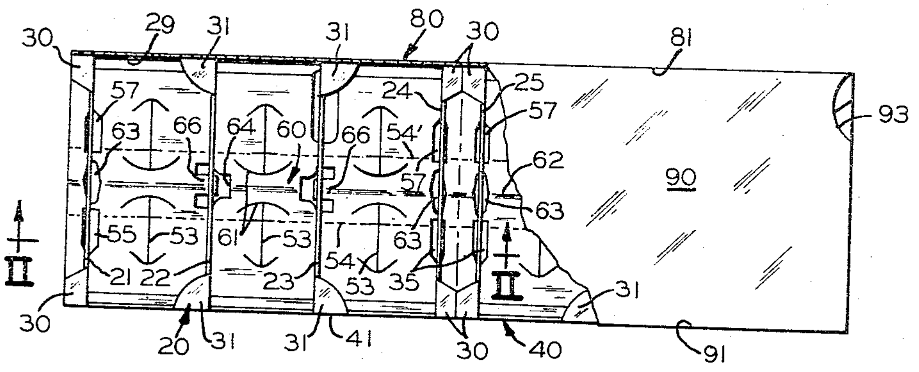
FIG. 3 is a plan view of the carton shown in FIG. 2 with part of the lid or cover broken away.

The partial-depth transverse partitions 22, 23, 26 and 27 are provided with upwardly extending projecting portions 37 with notches 38 therein, which portions 36 extend above the top of the top panel 20 when in erected position as shown in FIGS. 1, 2, and 4 and may even support the lid portion 90. The notches 38, however, are provided for engagement with a bar means in the set-up machine for alignment of the cross-partitions and cartons as they pass through the machine, to reduce jamming and mis-folding of the carton in the machine. The partial depth or intermediate transverse or cross-partition 22, 23, 26 and 27 are also provided apertures 39 in their lower center portions for engagement with special tongues 66 in the notches 64 in central longitudinal partition 60.

I–2. *Front panel*

Regarding the front panel 40 there is preferably provided between each of the transverse or cross-partitions a wide V-shaped notch 43, which in the blank shown in FIG. 5 provides irregular triangular shaped cut-outs between it and the adjacent end edge of the cross-partitions 21 through 28. These wide V-shaped notches not only facilitate the separation of the full length cross-partitions from the front panel when set up in the set-up machine because of the spaces in the cut-out portions between them, but also provide better viewing of the eggs in the front carton when the carton is set up as shown in FIG. 1. Furthermore, these wide V-notches 43 also provide easier tucking-in of the tabs 94 and 95 and the hooks 96 on the front flap 92 shown in FIG. 2. Similar cut-outs may be provided along the flange 29 of the top portion to facilitate set up of the other end edges of these cross-partitions (see FIG. 7 and cut-outs 187 in FIG. 8), however such are not shown in this embodiment in that the cut-outs from the transverse panels do not form a straight line across the inside of the back wall or panel, but show an irregular edge corresponding to the shape of the adjacent ends of cross-partitions (see on the back panel 80 in FIG. 1, and on the blank in FIG. 5).

I–3. *Bottom panel sections*

Referring now to the bottom panel 50, there is provided on the portion or section 52 thereof hinged to the front portion 40 along the crease or score line 42, a plurality of drooping T-shaped slits 53 (see FIGS. 3, 5 and 6) extending from transverse slits in the fold line 54 at the start of the central longitudinal inverted V-panel section 60. These slits 53 occur at the bottom of the cells of the carton to cushion the articles or eggs placed therein. At each end of this panel section 52 as well as in its center, there are provided apertures or slots 55 with hook-shaped slits 56 at their ends, which slots 55 are in alignment with the legs 34 of the full depth cross-partitions 21, 24, 25 and 28, and through which slots 55 these legs 34 project and into which slits 56 their edges are clamped and held. The inner or upper ends of the slots 55 extend up into the lower sides of the central inverted V-shaped longitudinal partition 60 and provide therein engagement edges for the hooks 35 of these full depth cross-partitions.

These slots 55 and slits 56 in bottom section 52 have corresponding complementary slots 57 with hooked slits 58 at their ends in the rear panel section 59 hinged to the fold line 51 of the back panel 80, but these slots 57 do not extend as far into the side of the longitudinal center partition 60 as do the apertures 55, since these ends of the slots 57 are for specific engagement with finger and hook means of the feeding mechanism in the set-up machine, so that these machine means will not also engage the corresponding ends of the longer slots 55 (see FIGS. 5 and 6 for comparison of the lengths of these slots 55 and 57.

The bottom panel section 59 is also provided with the dropping T slits 53, in complementary position to those shown in the panel 52.

I–4. *Central longitudinal partition*

Referring now to the central inverted V longitudinal partition portion, which is folded upwardly from the bottom panel 50 along fold lines 54 and 54', it has in each side thereof umbrella shaped slits 61, similar to the drooping T shaped slits 53 shown in the bottom panel sections 52 and 59, which slits 61 are in alignment therewith and also are for cushioning the articles or eggs placed into the cells of the carton. In alignment with the slots 55 and 57 in the bottom panels 52 and 59, there are provided across the central ridge 62 of this inverted V longitudinal partition, notches or slots 63 into which are fitted the central portions of the full depth cross-partition 21, 24, 25 and 28 which portions are above their trapezoidal notches 36.

Also there are provided in alignment with the partial depth cross-partitions 22, 23, 26 and 27, complementary notches 64 across the central ridge 62, which notches 64 are provided with abutting edges 65 along one side thereof for engagement with one side or face of these cross-partitions. These abutting edges 65 are located vertically beyond or slightly more than 90° from the folds at the triangular upper end section 31 to insure the vertical position of these cross-partitions and overcome any resistance in the fold itself. In order to hold these partial depth cross-partitions in these notches 64, there are also provided projecting tongues 66 on the opposite side of said notches 64 to engage in the apertures 39 of these cross-partitions. The upper portions 67 of the abutting edges 65 of these notches 64 are preferably rounded to facilitate the insertion of the bottom edges of the partial depth cross-partitions in said notches 64 by the set-up machine.

I–5. *Back panel*

Referring now to the back panel or wall 80 of the carton, there are shown projecting therein a pair of apertures 82, the major portion of which extend into the bottom panel section 59. These apertures 82 are placed in a carton primarily for fingers employed in the set-up machine to spread the carton apart from its collapsed position shown in FIG. 6.

Also across the center of this back panel 80 and extending across the center of all of the other panels, that is shown longitudinally of the center of the blank shown in FIG. 5, may be provided a dashed slit line 83, for facilitating the dividing of the carton into two half dozen cell sections, when a full dozen cell carton is not desired. However, such a dashed slit line is not necessary (see FIGS. 9–14), and when it is not provided, only one of the two central full depth cross partitions 24 or 25 need be formed in the blank and carton. The omission of one of the pair of central full-depth cross-partitions may provide additional central cut-outs or apertures in the blank, such as shown at 225 in FIG. 13.

I–6. *Cover*

Referring to the cover or lid panel section 90, there may be provided therein near the hinge score line 81 with the back panel 80, shallow notches 93 at its end edges, solely for the sensing or finger means in the closer machine for automatically closing the cartons after they are filled in the special filling machine.

Along the front tuck-in flap 92 hingedly attached by the score line 91 in the lid panel 90, are preferably provided a plurality of complementary hook tabs 94 at each end and in the center of the carton on each side of symmetrical central tabs 95. The hook portions 96 of the tabs

94 engage and lock underneath the triangular portions 31 of the top panel 20 when the cover 90 is in its closed position as shown in FIGS. 2 and 4.

II. LARGE SIZE EGG CARTON

Figure 7:
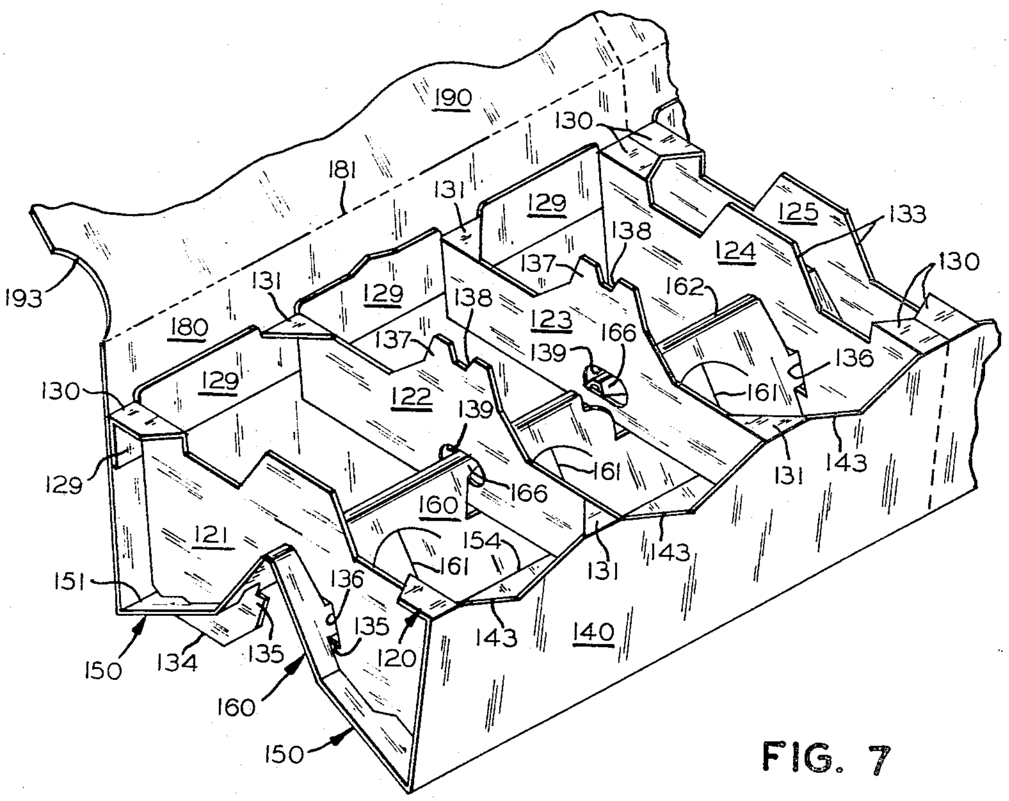
FIG. 7 is a perspective view with parts broken away, similar to that shown in FIG. 1 but of a modified form of egg carton according to this invention particularly adapted for large size eggs.
Figure 10:
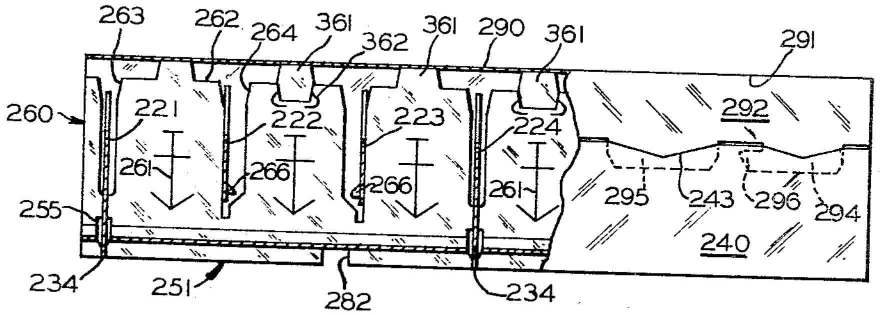
FIG. 10 is a reduced partially sectioned side elevational view of the embodiment of the egg carton shown in FIG. 9, being sectioned along line X—X of FIG. 11.
Figure 8:
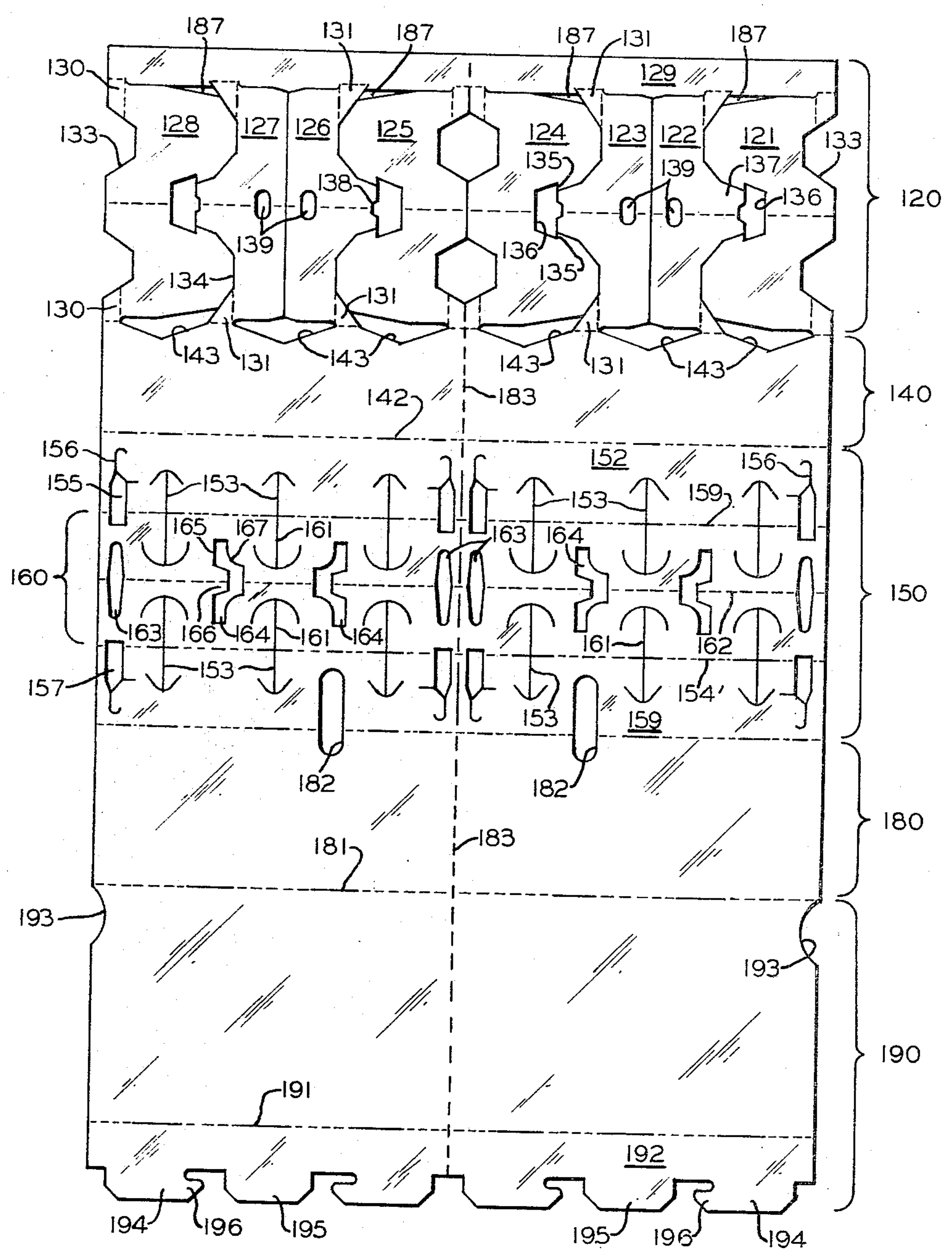
FIG. 8 is a plan view of the single piece blank, similar to that shown in FIG. 5, from which the egg carton according to the embodiment shown in FIG. 7 is produced.
Figure 9:
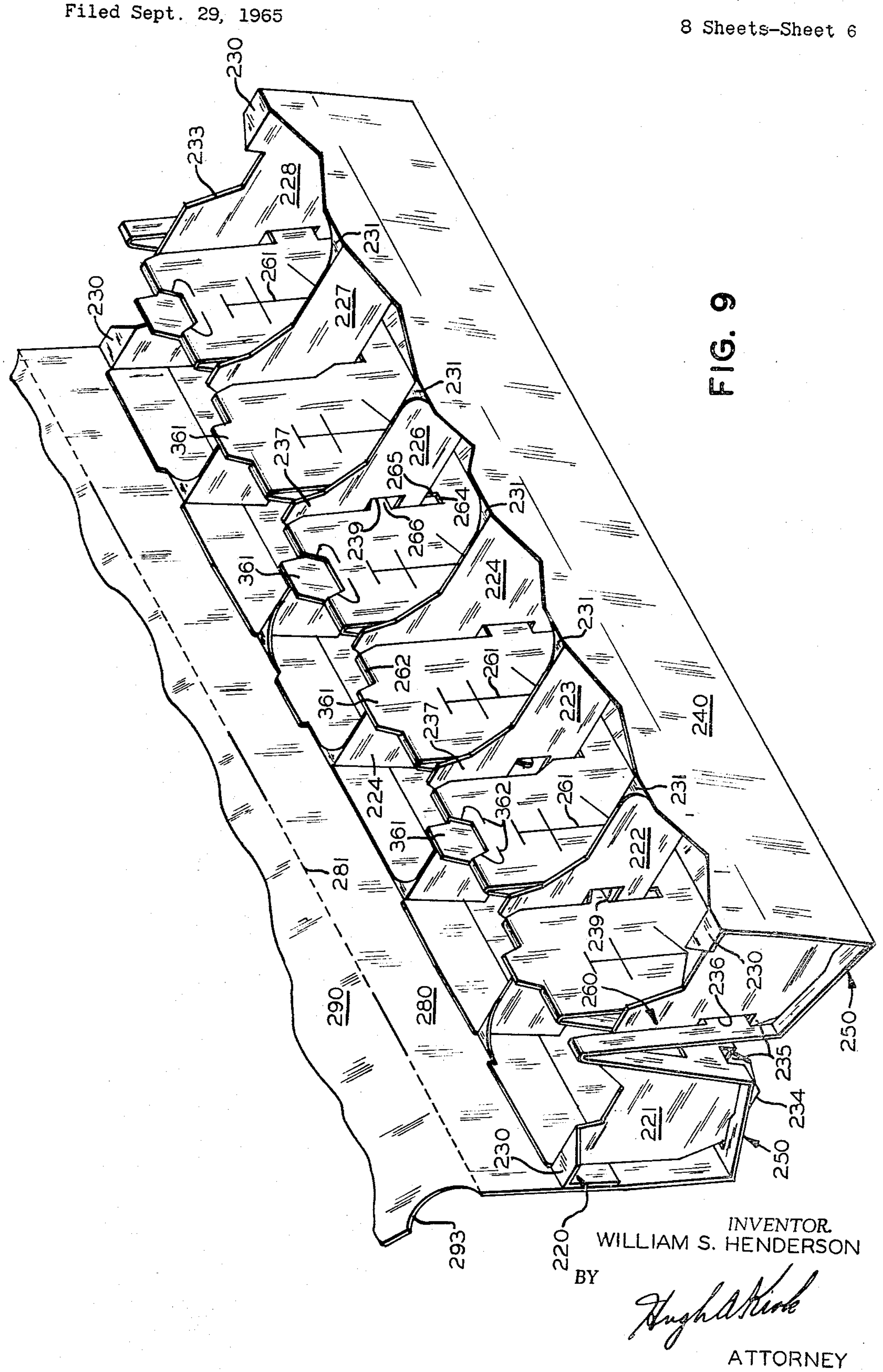
FIG. 9 is a perspective view with part of the lid or cover broken away, of an egg carton according to another embodiment of this invention for extra large size eggs.

Referring now to the embodiment shown in FIGS. 7 and 8, similar portions of the carton to those described in FIGS. 1 through 6 have the same tens units numbers for their reference characters.

One distinction of this particular carton over that described in Part I above, is that the triangular end portions 131 of the cross-partitions 122, 123, 126 and 127 have straight hypotenuses as shown in these figures. These comparatively straight hypotenuses have the advantage of permitting larger articles or eggs to be placed in the cells, and thereby facilitate their insertion into the cells from a filling machine.

Another distinction of this carton is the cut-outs or apertures 187, shown in the blank in FIG. 8, provide a straighter top edge above or along the back flange 129 shown in FIG. 7, and also provide easier folding of the cross-partitions in the set-up machine.

III. EXTRA LARGE SIZE EGG CARTON

Referring finally to the embodiment shown in FIGS. 9 through 14, all of the similar portions of this embodiment also have the same tens and units numbers for their reference characters.

In this embodiment, a further distinction from the previous two embodiments described in Parts I and II above, is that the triangular portions 231 in the top panel 220 have concave hypotenuses to provide more room for extra large articles or eggs to be placed in this carton. Furthermore the single center full depth cross-partition 224 also has its upper end hinged portions 230 substantially triangular, also with concave hypotenuses.

Figures 11, 12:
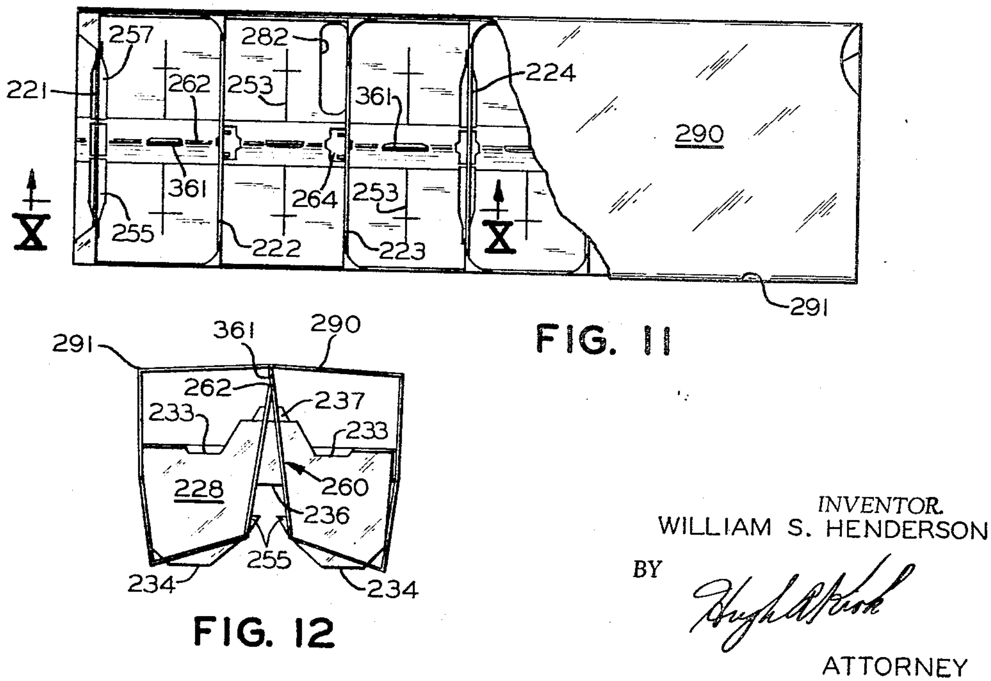
FIG. 11 is a plan view of the egg carton shown in FIG. 10 with part of the cover broken away.
FIG. 12 is an end view of the egg carton shown in FIGS. 10 and 11.
Figure 13:
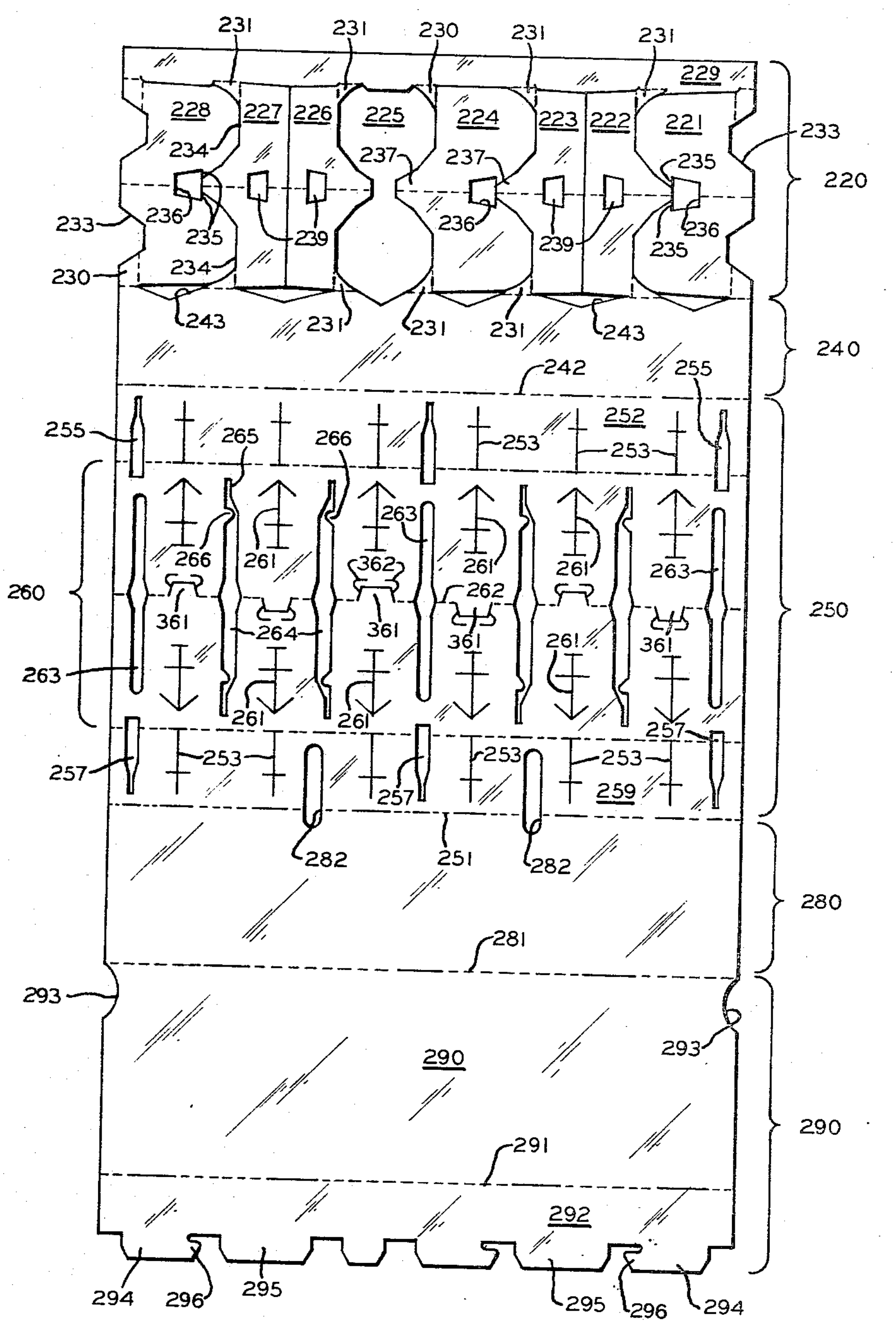
FIG. 13 is a plan view of the single paperboard blank from which the egg carton according to FIGS. 9 through 12 is constructed.

This embodiment also has a much wider or larger central longitudinal V partition section 260 in the blank in FIG. 13, and the opposite ends of its cross-partitions 221 through 228 are substantially parallel, as shown in FIGS. 12 and 13.

As previously mentioned the blank shown in FIG. 13 is provided with a joining pair of central polygonal apertures 225, instead of having a second central cross-partition, in that no central dashed slit dividing line is provided for separating this carton into two half sections as in the other two embodiments.

Another distinction of this carton from those of the previous embodiments, is in the bottom panel 250, in which the front 252 and the back 259 panel sections are provided with cross shaped slits 253 for cushioning the eggs at the bottom of each cell, and separated therefrom in the sides of the central high inverted V longitudinal portion 260, there are provided arrow shaped slits 261 with two cross slits thereon, for similar purposes. Also the slits 255 and 257 in the bottom panel sections 252 and 259 respectively, need not have hooked slots at their ends for the wedging engagement of the sides of the legs of the full depth cross or transverse partitions 221, 224, and 228.

Across the longitudinal center partition, the notches 263 for the full depth cross-partitions 221, 224 and 228 are much longer or deeper, as are the notches 264 for the partial depth cross-partitions 222, 223, 226 and 227. The tongues 266 in these notches 240 are located near the bottom of the notches and not along the center ridge 262.

Figure 14:
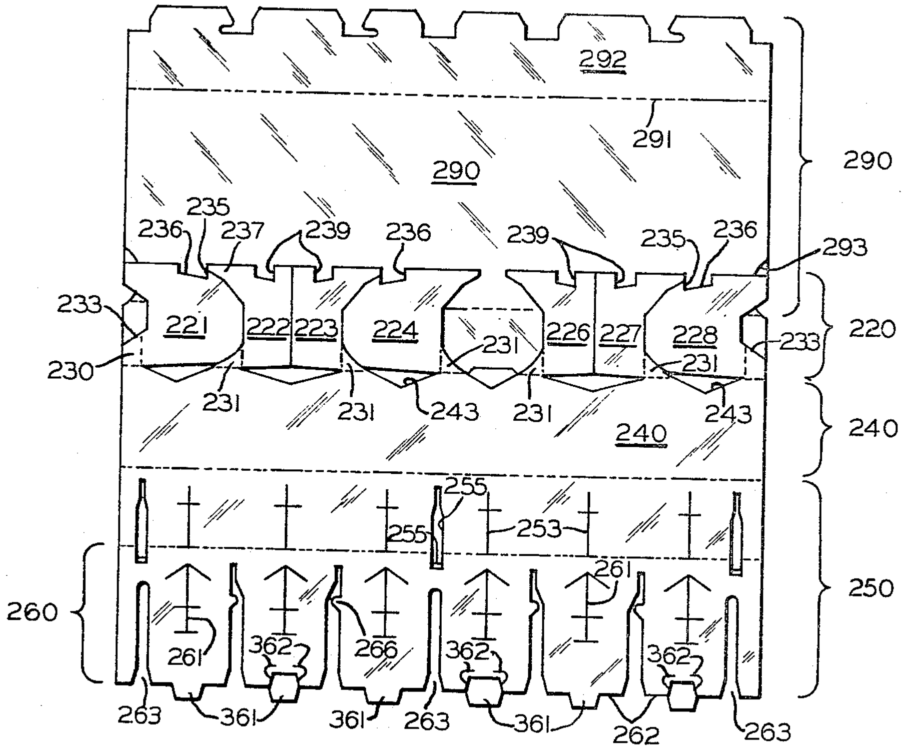
FIG. 14 is a plan view of a folded collapsed egg carton formed from the blank shown in FIG. 13 and ready for set up in a set-up machine.

In addition, there are provided on alternate opposite sides of the central partition 260 between the notches 263 and 264, upwardly extending tabs 361 which are cut out from the opposite side of the central V-partition, the cutouts having at the lower corners hooked slits 362 as shown in the blank in FIG. 13 and in the collapsed condition of the carton in FIG. 14, to facilitate release of these tabs 361 when being set up in the set-up machine. The upwardly projecting tabs 361 above the center ridge 262 as shown in FIG. 1, prevent the cover 290 from being pushed too far down to crush the large eggs in the cell, and thus also may support the cover 290 (see FIGS 10 and 12).

It should be understood that many of the features shown in any one of the three embodiments may be interposed with those of the other embodiments, without departing from the scope of this invention.

While there is described above the principles of this invention in connection with specific apparatus, it is to be clearly understood that this description is made only by way of example and not as a limitation to the scope of this invention.

What is claimed is:

1. A partitioned carton having two rows of cells comprising:

(a) a top from which transverse vertical partitions are formed,
(b) a front having wide straight edged V-notches along its top edge between said transverse partitions,
(c) a back,
(d) a bottom, upwardly from the longitudinal center of which extends a longitudinal partition dividing the cells formed by said transverse partitions into two rows, said bottom including slots on opposite sides of said longitudinal partition for at least the end ones of said transverse vertical partitions, said slots adjacent said front being longer than those adjacent said back on the other side of said longitudinal partition, whereby engagement of the end of both said slots is avoided by the set-up machine when said carton is collapsed, and
(e) a lid hinged to said back having tongues along its front for engagement in at least some of said V-shaped notches.

2. A carton according to claim 1 wherein said transverse vertical partitions are folded from right triangular webs at the ends of said transverse partitions.

3. A carton according to claim 2 wherein said triangular webs have straight hypotenuse sides.

4. A carton according to claim 2 wherein said right triangular webs have convex hypotenuse sides.

5. A carton according to claim 2 wherein said right triangular webs have concave hypotenuse sides.

6. A carton according to claim 2 wherein said longitudinal partition has vertical notches therein for engaging at least some of said transverse partitions, said notches having transverse partition abutting vertical edges on one side thereof and projecting tongues above and extending slightly beyond said vertical edges on the other side thereof for maintaining said folded vertical transverse partitions against the action of their folds.

7. A carton according to claim 1 wherein said longitudinal partition includes spaced upwardly extending tabs along the top edge thereof, said tabs being cut from alternate sides of said longitudinal partition, and said tabs being spaced between said transverse partitions.

8. A carton according to claim 7 wherein said cuts for said tabs include hooked slits extending from the lower corner of each cut to facilitate release of said tabs from said cuts.

9. A carton according to claim 7 wherein said tabs extending upwardly from said longitudinal partition support said lid when said carton is closed.

10. A carton according to claim 1 wherein said transverse vertical partitions include notches in the center tops of at least some thereof for alignment of said carton in its set-up machine.

11. A carton according to claim 1 wherein said bottom on each side of said longitudinal partition contains slits for cushioning the bottom of each cell formed by said cross-partitions.

12. A partitioned carton having two rows of cells comprising:

(a) a top from which transverse vertical partitions having central apertures therein are folded vertically downwardly,
(b) front and back walls, and
(c) a bottom, upwardly from the longitudinal center of which extends a longitudinal partition dividing the cells formed by said transverse partitions into two rows, said longitudinal partition having vertical notches therein for engaging at least some of said transverse vertical partitions, said notches having:
  (1) transverse partition-abutting vertical edges on one side thereof slightly beyond the vertical line and against the action of the folds of said transverse partitions,
  (2) projecting tongues above and extending beyond said vertical edges on the other side thereof for insertion into said central apertures in said folded vertical transverse partitions, for maintaining them in place, and
(d) said bottom including slots on opposite sides of said longitudinal partition for the bottom edge of at least said end transverse vertical partitions, said slots adjacent said front wall being longer than those adjacent said back wall, whereby engagement of the ends of both slots is avoided by the set-up machine when said carton is collapsed.

13. A carton according to claim 12 wherein said abutting edges are rounded outwardly at the top opening of said notches opposite said tongues for facilitating the folding of said transverse partitions into said notches.

14. A carton according to claim 12 wherein said front wall has wide V-notches along its top edge between said transverse partitions.

15. A carton according to claim 13 wherein said transverse vertical partitions are folded from right triangular webs at the ends of said transverse partitions.

16. A carton according to claim 15 wherein said triangular webs have straight hypotenuse sides.

17. A carton according to claim 15 wherein said right triangular webs have convex hypotenuse sides.

18. A carton according to claim 15 wherein said right triangular webs have concave hypotenuse sides.

19. A carton according to claim 15 wherein said transverse vertical partitions have notches in the top centers of at least some thereof for alignment of said carton in its set-up machine.

20. A partitioned carton to have two rows of cells, comprising:

(a) a top from which transverse vertical partitions are folded from right triangular webs at the upper ends of said transverse vertical partitions,
(b) a front having wide V-notches along its top edge between said transverse partitions,
(c) a bottom having upwardly extending from the longitudinal center thereof, an inverted-V longitudinal partition dividing the cells formed by said transverse partitions into two rows, and having notches therein for engaging at least some of said transverse partitions, said notches having transverse partition abutting vertical edges on one side thereof and projecting tongues above and extending slightly beyond the said vertical edges on the other side thereof for maintaining said folded transverse partitions vertical against the action of their folds at said triangular webs, the top of said longitudinal partition containing spaced upwardly extending tabs cut from alternate sides of said longitudinal partition, said tabs being spaced by said transverse partitions and said cuts for said tabs containing hooked slots from each lower corner thereof for easy release of said tabs therefrom,
(d) a back, and
(e) a lid hinged to said back having oppositely hooked tongues along its front for engagement in said V-notches and under said triangular webs.

21. A carton according to claim 20 wherein said top and transverse vertical partitions, said front, said bottom and longitudinal partition, said back and said lid with said tongues are all formed from a single rectangular blank.

22. A carton according to claim 20 wherein said right triangular webs have straight hypotenuses.

23. A carton according to claim 20 wherein said right triangular webs have a convex hypotenuse.

24. A carton according to claim 20 wherein said right triangular webs have concave hypotenuses.

25. A carton according to claim 20 wherein said transverse vertical partitions have notches in the top centers of at least some thereof for alignment of said carton in its set-up machine.

References Cited

UNITED STATES PATENTS

| | | | |
|---|---|---|---|
| 1,915,171 | 6/1933 | Troyk | 229—29 |
| 2,125,730 | 8/1938 | Levkoff | 229—29 |
| 2,321,209 | 6/1943 | Holwick | 229—29 |
| 2,455,291 | 11/1948 | Benoit | 229—29 |
| 3,034,696 | 5/1962 | Swanson | 229—28 |
| 3,219,254 | 11/1965 | Hall et al. | 229—28 |
| 3,251,531 | 5/1966 | Hook et al. | 229—28 |

JOSEPH R. LECLAIR, *Primary Examiner.*

GEORGE O. RALSTON, *Examiner.*